United States Patent [19]

Serizawa

[11] 3,821,805

[45] June 28, 1974

[54] TAPE LOADING DEVICE FOR MAGNETIC RECORDING AND/OR REPRODUCING APPARATUS

[75] Inventor: Akio Serizawa, Tokyo, Japan

[73] Assignee: Sony Corporation, Tokyo, Japan

[22] Filed: Apr. 27, 1973

[21] Appl. No.: 354,992

[30] Foreign Application Priority Data

May 4, 1972 Japan .......................... 47-52394[U]

[52] U.S.Cl. ......................... 360/85, 226/91, 274/4 E

[51] Int. Cl. ......................... G11b 15/66, G11b 5/52

[58] Field of Search ............ 179/100.2 ZA, 100.2 T; 242/55.19 A; 274/4 B, 4 C, 4 E

[56] References Cited

UNITED STATES PATENTS

| | | | |
|---|---|---|---|
| 3,673,348 | 6/1972 | Larkin | 179/100.2 ZA |
| 3,681,539 | 8/1972 | Eibensteiner | 179/100.2 ZA |
| 3,721,776 | 3/1973 | Inaga | 179/100.2 ZA |
| 3,740,492 | 6/1973 | Inaga | 179/100.2 ZA |
| 3,740,495 | 6/1973 | Kihara | 179/100.2 ZA |

*Primary Examiner*—Alfred H. Eddleman
*Attorney, Agent, or Firm*—Lewis H. Eslinger, Esq.; Alvin Sinderbrand, Esq.

[57] ABSTRACT

In a magnetic recording and/or reproducing apparatus having a tape guide drum, at least one rotary magnetic head moved in a circular path coinciding with the circumferential surface of the drum for scanning a magnetic tape wrapped about at least a portion of that surface, a tape supply, such as, a cassette containing reels on which a magnetic tape is wound, and a holder for receiving and positioning the cassette at a location spaced from the guide drum, a tape engaging member is provided on a rotatable support ring which extends under the cassette so that, when the ring is in a starting position, the tape engaging member extends into an opening of the cassette for engagement with the tape between the reels, and a tape guiding member mounted on the support ring and being moved relative to the latter from an inner position, at which the tape guiding member also extends into the cassette opening with the support ring at its starting position, to an outer position spaced outwardly from the support ring in response to turning of the latter to an operative position, during which turning the tape engaging member draws a loop of tape from the cassette and wraps one side of the loop about the guide drum and the tape guiding member engages the other side of the tape loop and, in its outer position, maintains said other side of the tape loop away from the guide drum.

14 Claims, 8 Drawing Figures

TAPE LOADING DEVICE FOR MAGNETIC RECORDING AND/OR REPRODUCING APPARATUS

BACKGROUND OF THE INVENTION

1. Field of the Invention

This invention relates generally to magnetic recording and/or reproducing apparatus, such as, video tape recording and reproducing apparatus (VTR), and more particularly is directed to an improved automatic tape loading and unloading device for such apparatus.

2. Description of the Prior Art

Existing video tape recording and reproducing apparatus generally comprise a tape guide drum having a rotary magnetic head assembly associated therewith to record or reproduce video signals on a magnetic tape which is usually wound on supply and take-up reels with the tape between such reels being wrapped about at least a portion of the circumferential surface of the drum and being driven by a cooperating capstan and pinch roller and by suitable rotation of the take-up reel. In preparing such a video tape recording and reproducing apparatus for operation, the tape extending between the supply and take-up reels must be placed around or wrapped about at least a portion of the drum circumference so that the tape will be guided thereby with respect to the rotary magnetic head assembly. In the conventional apparatus, it has generally been necessary for the user to manually thread the tape from the supply reel through various guide members, around the guide drum and between the capstan and pinch roller, and then back to the take-up reel. Further, upon the completion of the recording or reproducing of video signals on a particular magnetic tape, it has been necessary for the user to manually remove the tape from the guide drum and then to manually rotate the supply or take-up reel for returning the resulting loose tape thereto prior to the removal of the reels from the apparatus. The foregoing operations require considerable manual dexterity and are time consuming. When the supply and take-up reels are contained in a cassette, the manual loading and unloading of the tape about the guide drum is particularly difficult to accomplish. If the tape is not properly threaded, damage to the tape and defective recording or reproducing of the signals may result. Further, if there is foreign matter on the user's fingers when handling the tape during the manual loading or unloading of the tape about the guide drum, such foreign matter can be transmitted to the tape and may adversely affect the fidelity of the recording or reproducing of the signals.

Automatic tape loading and unloading devices have been previously proposed to avoid the above mentioned disadvantages. For example, an automatic tape loading and unloading device for a video signal recording and/or reproducing apparatus is disclosed in detail in copending U.S. Pat. application Ser. No. 113,988, filed Feb. 9, 1971, now U.S. Pat. No. 3,740,495, and having a common assignee herewith. In such automatic tape loading and unloading device, a rotatable support member, in the form of a ring, extends around the guide drum and carries a number of tape guidee which define an arcuate guide path spaced from the drum, and a tape engaging member is also mounted on the rotatable support member and is movable with respect to the latter into and out of the arcuate guide path. In an inactive or starting condition of the device, the tape engaging member is displaced out of the guide path so as to engage the tape between the take-up and supply reels which may be contained in a cassette or cartridge, and the tape engaging member is moved into the guide path upon turning of the rotatable support member during a loading operation to draw a loop of the tape from one or both of the reels and to wrap one side of the loop about the guide drum while the tape guides move into the loop and engage the other side of the loop for maintaining such other side away from the surface of the guide drum. During the tape unloading operation of the device, the tape engaging member remain sin the guide path during the major portion of its movement with the rotatable support member for unwrapping the tape from about the guide drum and, at the conclusion of the tape unloading operation, the tape engaging member is moved out of the guide path so as to permit the return or rewinding of the tape which constituted the loop on at least one of the reels.

Although the above described tape loading and unloading device as disclosed in the identified copending application is generally satisfactory, the relatively large number of tape guides on the rotatable support member make it difficult to stabilize the tape path during recording and reproducing operations. Such tape guides are in the form of pins which must be precisely shaped and oriented on the rotatable support member and thereby give rise to manufacturing difficulties. Further, the rotatable support member in the form of a ring does not extend under the cassette or cartridge and the tape engaging member projects outwardly from the ring in the inactive condition of the device for engaging the tape in the cassette or cartridge, so that the overall dimensions of the recording and/or reproducing apparatus are undesirably large. It is also to be noted that, as the tape loop is being formed, the relatively large number of tape guides or pins have to move into the tape loop from the outside of the latter and this is a fairly delicate operation which makes the tape loading and unloading device susceptible to improper loading.

SUMMARY OF THE INVENTION

Accordingly, it is an object of this invention to provide a magnetic recording and/or reproducing apparatus of the described type with an automatic tape loading and unloading device which avoids all of the disadvantages of the devices previously proposed for the stated purposes.

Another object is to provide an automatic tape loading and unloading device which is relatively simple in construction and operation, and which is also relatively compact so as to minimize the space required for such device.

Still another object is to provide an automatic tape loading and unloading device which is thoroughly reliable in its operation.

A further object is to provide an automatic tape loading and unloading device, as aforesaid, that is adapted for use in connection with a magnetic recording and/or reproducing apparatus employing a magnetic tape contained in a cassette or cartridge.

Still another object is to provide an automatic tape loading and unloading device, as aforesaid, that provides a stabilized path for the tape during recording and reproducing operations.

In accordance with an aspect of this invention, an automatic tape loading and unloading device for a magnetic recording and/or reproducing apparatus comprises a rotatable support, for example, in the form of a ring, turnable around the guide drum in an arcuate path that extends under the cassette when the latter is received and positioned by the holder therefor, a tape engaging member carried by the support ring and extending into an opening of the cassette for engagement with the tape therein when the ring is in an inactive or starting position, such tape engaging member drawing a loop of tape from the cassette and wrapping one side of the tape loop about the guide drum upon turning of the ring to an operative position during a tape loading operation, and a tape guiding member mounted on the support ring and being moved relative to the latter from an inner position, at which the tape guiding member also extends into the cassette opening with the support ring at its starting position so as to be disposed within the tape loop, to an outer position spaced outwardly from the support ring in response to movement of the latter to its operative position during a loading operation, so that the tape guiding member then holds the other side of the tape loop away from the guide drum.

In accordance with the foregoing aspect of the invention, the tape engaging member and the tape guiding member, that is, all elements which are to be disposed inside the tape loop at the completion of a tape loading operation, are disposed within the tape loop at the initiation of the tape loading operation so as to achieve complete reliability in such operation.

In accordance with another feature of the invention, the movement of the tape guiding member from its inner position to its outer position is preferably effected by a control member located at a fixed position adjacent the support ring so as to act on the tape guiding member as the support ring is turned from its starting position to its operative position.

In accordance with still another feature of the invention, the mounting of the tape guiding member on the support ring is arranged so that the tape guiding member is disposed relatively close to the tape engaging member in the starting position of the support ring for convenient entry of both the tape engaging and guiding members into the cassette opening, and the tape guiding member is relatively widely spaced from the tape engaging member, in the direction along the support ring, in response to the movement of the support ring to its operative position for effectively holding the side of the tape loop engaged by the tape guiding member away from the guide drum.

Further, a locking device may be provided for locking the tape guiding member in its outer position when the support ring attains its operative position, thereby to stabilize the position of the tape guiding member during recording and reproducing operations.

The above, and other objects, features and advantages of this invention, will be apparent from the following detailed description of illustrative embodiments thereof which is to be read in connection with the accompanying drawings.

DESCRIPTION OF THE PREFERRED EMBODIMENTS

Figure 1:
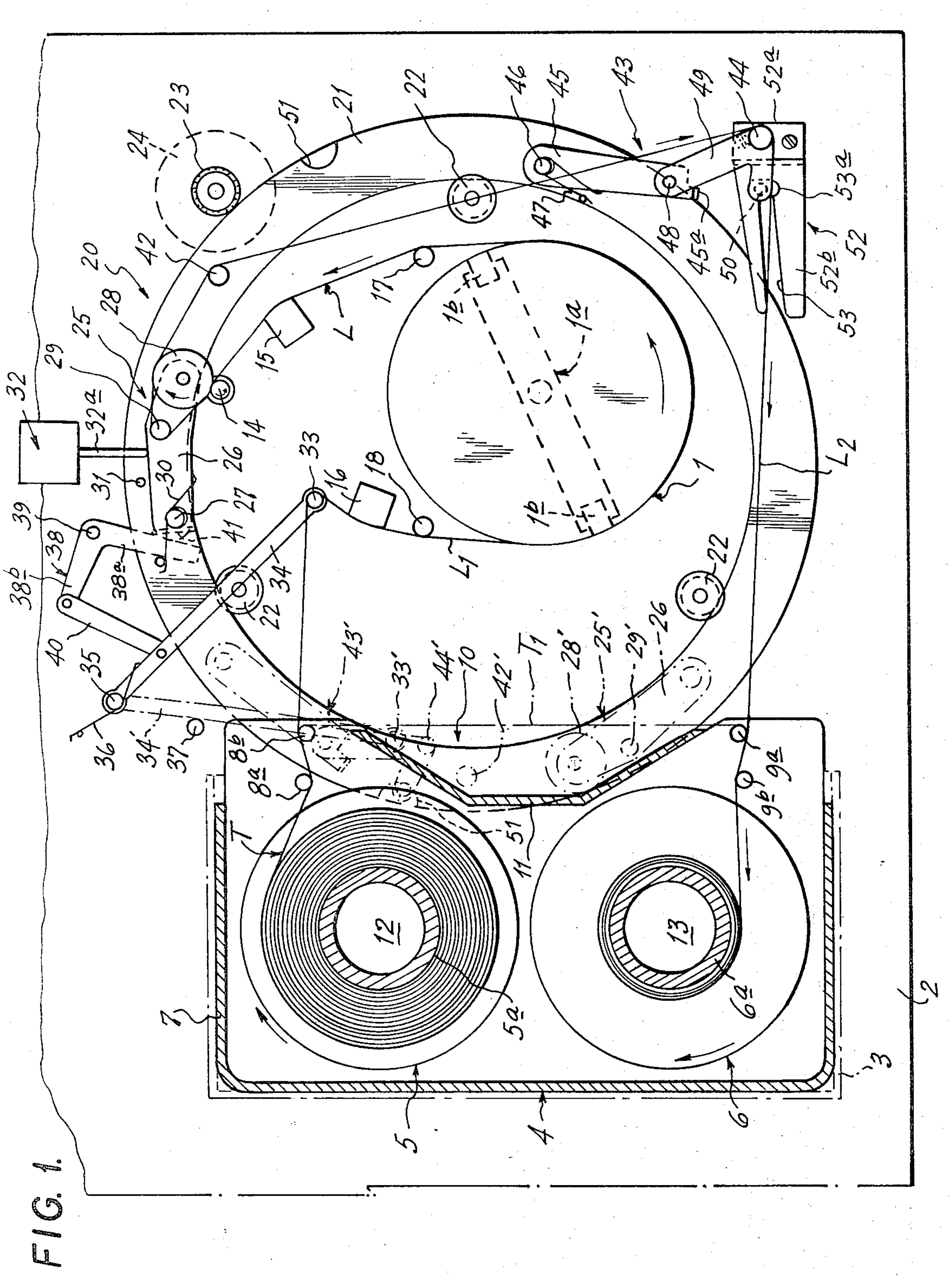
FIG. 1 is a schematic top plan view of a magnetic recording and/or reproducing apparatus provided with a tape loading and unloading device according to one embodiment of this invention.

Referring to the drawings in detail, and initially to FIG. 1 thereof, it will be seen that, in a magnetic recording and/or reproducing apparatus according to this invention, as there illustrated, a cylindrical tape guide drum 1 is mounted on a chassis 2 and has a circumferential slot or gap (not shown), and a rotary magnetic head assembly **1*a* (appearing in broken lines) is rotatably mounted in drum 1 and includes one or more magnetic heads 1*b* which are moved along the slot or gap, that is, in a circular path substantially coinciding with the peripheral surface of drum 1**.

A cassette holder 3, indicated schematically in broken lines, is suitably mounted on chassis 2 at one side of guide drum 1 for movement between a raised position, in which holder 3 is adapted to receive a tape cassette 4, and a lowered or operative position, in which the cassette is positioned for a recording or reproducing operation. The tape cassette 4 is shown to include a supply reel 5 and a take-up reel 6 rotatably contained within a housing 7 and having a magnetic tape T wound thereon. The tape T extending between reels 5 and 6 is guided about guide pins **8*a* and 8*b* adjacent reel 5 and about guide pins 9*a* and 9*b* adjacent reel 6 so as to normally follow a path including a run, indicated in broken lines at $T_1$, between guide pins 9*a* and 9*a* at which the tape is exposed through an opening 10. The opening 10 extends along the side and bottom portion of housing 7 which is directed toward guide drum 1 when cassette 4 is received by holder 3. Access to the interior of cassette housing 7 through opening 10 is limited by a partition 11 which extends along the edge of opening 10 in the bottom wall of housing 7 from near guide pin 8*a* to near guide pin 9*a***, and which is spaced inwardly from the run $T_1$ of the tape.

Reel support shafts 12 and 13 extend upwardly from chassis 2 and are respectively engageable by the hubs **5*a* and 6*a* of supply reel 5 and takeup reel 6 when holder 3 is lowered to its operative position with the cassette 4 received therein. Suitable drive assemblies (not shown) may be provided for driving take-up reel support shaft 13 in the direction winding the tape T on take-up reel 6 during recording, reproducing and fast-forward operations of the apparatus, and for driving supply reel support shaft 12 in the direction for rewinding the tape on supply reel 5** during rewinding operation of the apparatus.

The recording and/or reproducing apparatus is further shown to include a capstan 14 which is suitably driven from a drive motor (not shown), a fixed magnetic head assembly 15 for recording and/or reproducing audio and control signals, an erasing head 16 and tape guides 17 and 18, all of which are mounted on chassis 2 at predetermined spaced apart positions. In order to operate the magnetic recording and/or reproducing apparatus, it is necessary to load the tape from cassette 4 on holder 3 about at least a portion of the circumferential surface of guide drum 1 for scanning by the rotary magnetic head assembly 1*a* associated with the guide drum, and further to engage the magnetic tape with capstan 14 so that the latter will drive the tape and also with the fixed magnetic heads 15 and 16. When it is desired to remove the cassette 4 from the apparatus at the conclusion of a recording or reproducing operation, it is necessary to unload the tape about drum 1 and to return the tape to the cassette 4.

In accordance with the present invention, a device 20 for performing the above described tape loading and unloading functions generally includes a support member 21 which is preferably in the form of a ring, as shown, and which is rotatable about guide drum 1 in a circular or arcuate path that extends under the opening 10 of a cassette 4 positioned by the holder 3. The support ring 21 may be disposed eccentrically with respect to guide drum 1, as shown on FIG. 1, to provide a relatively large space therebetween, at the back of drum 1, for accommodating capstan 14, heads 15 and 16 and tape guides 17 and 18. Support ring 21 is shown to be rotatably supported by grooved rollers 22 which engage the inner periphery of ring 21 and which are suitably mounted above chassis 2. In order to effect turning of support ring 21 about guide drum 1, the outer periphery of ring 21 is frictionally engaged by a drive roller 23 which is rotatable by a suitable reversible electric motor 24.

Mounted on support ring 21 is a pinch roller assembly 25 which is shown to include a support arm 26 pivoted, at one end, on a pin 27 projecting upwardly from ring 21, a freely rotatable, upstanding pinch roller 28 carried by the opposite or free end portion of arm 26, and a tape engaging member or pin 29 extending upwardly from arm 26 intermediate its ends. The pinch roller assembly 25 is located on support ring 12 so that, when the support ring is turned to its operative position to dispose assembly 25 as shown in full lines on FIG. 1, pinch roller 28 is adjacent capstan 14 for cooperation with the latter in driving the magnetic tape therebetween. In the embodiment shown, a spring 30 acts on support arm 26 to urge the latter outwardly relative to ring 21 against a stop 31 for providing a small gap between pinch roller 28 and capstan 14, and an additional mechanism, indicated schematically at 32, may be provided to angularly displace support arm 26 in the inward direction for pressing pinch roller 28 against capstan 14. Such additional mechanism 32 may be simply constituted by a solenoid having an armature 32*a* which is extended to act inwardly against arm 26 in response to the energization of solenoid 32 during a recording or reproducing operation of the apparatus.

When support ring 21 is turned in the clockwise direction through approximately 250° from its operative position shown in full lines on FIG. 1 to its starting or inactive position, the pinch roller assembly is at the location indicated in broken lines at 25' on FIG. 1. It will be apparent that, with support ring 21 at its starting or inactive position, the downward movement of holder 3 with a cassette 4 positioned thereon causes the pinch roller and the tape guiding member at the positions indicated at 28' and 29', respectively, to project upwardly into opening 10 of cassette housing 7 at the side of tape run $T_1$ facing away from guide drum 1.

Tape loading and unloading device 20 according to this invention is further shown to include a tape guiding pin 33 projecting upwardly from one end of a support arm 34 which extends over ring 21 from a pivot pin 35 carried by chassis 2. Support arm 34 is urged by a spring 36 to the position indicated in broken lines at 34' against a stop 37 for disposing the tape guiding pin at the position indicated at 33' where such pin is also located to extend upwardly into opening 10 of cassette housing 7 at the side of tape run $T_1$ facing away from guide drum 1. In order to move tape guiding pin 33 to the position shown in full lines on FIG. 1 at the completion of a tape loading operation, a bell crank 38 may be pivoted on a pin 39 extending from chassis 2 adjacent ring 21, with one arm 38*a* of bell crank 38 extending under support ring 21 and the other arm 38*b* of the bell crank being connected to support arm 35 by way of a pivoted link 40. Further, as shown, an abutment 41 may depend from support ring 21 and be located with respect to the latter so that, as support ring 21 is turned in the counterclockwise direction and nears its operative position, abutment 41 acts against bell crank arm 38*a* to turn bell crank 38 in the clockwise direction, as viewed, whereby to displace support arm 34 from the position indicated at 34' to the position shown in full lines.

An upstanding tape guide pin 42 is also shown to be mounted on support ring 21 at a fixed location spaced by a relatively small distance from pinch roller 28 in the clockwise direction so that, when support ring 21 is in its starting or inactive position, such tape guiding pin will be at the location indicated in broken lines at 42' for projecting upwardly into opening 10 of cassette housing 7 received by the lowered cassette holder 3.

In accordance with this invention, the tape loading and unloading device 20 further comprises a tape guiding assembly 43 which is mounted on support ring 21 and includes a tape guiding member or pin 44. As shown and hereinafter described in detail, tape guiding member 44 is mounted on support ring 21 for movement relative to the latter from an inner position indicated in broken lines at 44', at which such tape guiding member is spaced from pinch roller 28' by a relatively small distance along ring 21 in the clockwise direction so as to also project upwardly into cassette opening 10 with the support ring 21 at its starting position, to an outer position shown in full lines on FIG. 1 in response to movement of the support ring to its operative position during a loading operation, at which outer position tape guiding member 44 is spaced outwardly from support ring 21 and also spaced a relatively large distance from pinch roller 28 in the clockwise direction along support ring 21. In order to permit the foregoing movements of tape guiding member 44 relative to ring 21, tape guiding assembly 43 is further shown to include an arm 45 pivoted, at one end, on a pin 46 carried by ring 21 and being urged by a spring 47 in the counterclockwise direction relative to ring 21 to the position shown on FIG. 3. The free end portion of arm 45 carries a pin 48 on which there is pivoted one end of a generally L-shaped support arm 49 having the tape guiding member or pin 44 projecting upwardly therefrom, as shown particularly on FIG. 2. The free end of L-shaped arm 49 has a locating pin 50 depending therfrom for a purpose hereinafter described in detail. Further, the free end of arm 45 has an upwardly bent tab 45*a* (FIG. 2) engageable by arm 49 for limiting the clockwise turning of arm 49 relative to arm 45 to the position shown on FIG. 3 in which a relatively small or acute angle $\theta$ is enclosed between the line C extending between the centers of pins 46 and 48 and the line C′ extending between the centers of pins 48 and 50. When support ring 21 is in its starting or inactive position, the turning of arm 45 in the counterclockwise direction by spring 47 is limited to the position shown on FIG. 3 by the engagement of depending pin 50 on arm 49 in a recess 51 formed in the top of support ring 21 and by the engagement of tab 45*a* with the adjacent arm 49. With arms 45 and 49 being thus located, arms 45 and 49 extend generally along ring 21 from pivot pin 46 in the direction toward pinch roller 28, and tape guiding member or pin 44 is disposed at its inner position relatively close to pinch roller 28.

In order to move tape guiding member or pin 44 from such inner position to its outer position in response to turning of support ring 21 from its starting position to its operative position, tape loading and unloading device 20 is further shown to comprise an actuating member 52 which is fixedly located on chassis 2 at a location adjacent support ring 21 past which pivot pin 46 moves during the turning of support ring 21 between its starting and operative positions. As shown, actuating member 52 includes a base portion 52*a* secured to chassis 2 and an elongated, elevated portion 52*b* which projects from base portion 52*a* over the outer periphery of ring 21. Elevated portion 52*b* has an elongated slot 53 opening at the free end of portion 52*b* for receiving locating pin 50 of tape guiding assembly 43 as ring 21 is moved from its starting or inactive position toward its operative position. Slot 53 is shown to diverge from ring 21 in the direction from its open end toward its opposite end which terminates in a laterally enlarged locking portion 53*a*.

The above described tape loading and unloading device 20 operates as follows:

TAPE LOADING OPERATION

Figures 3, 4, 5:
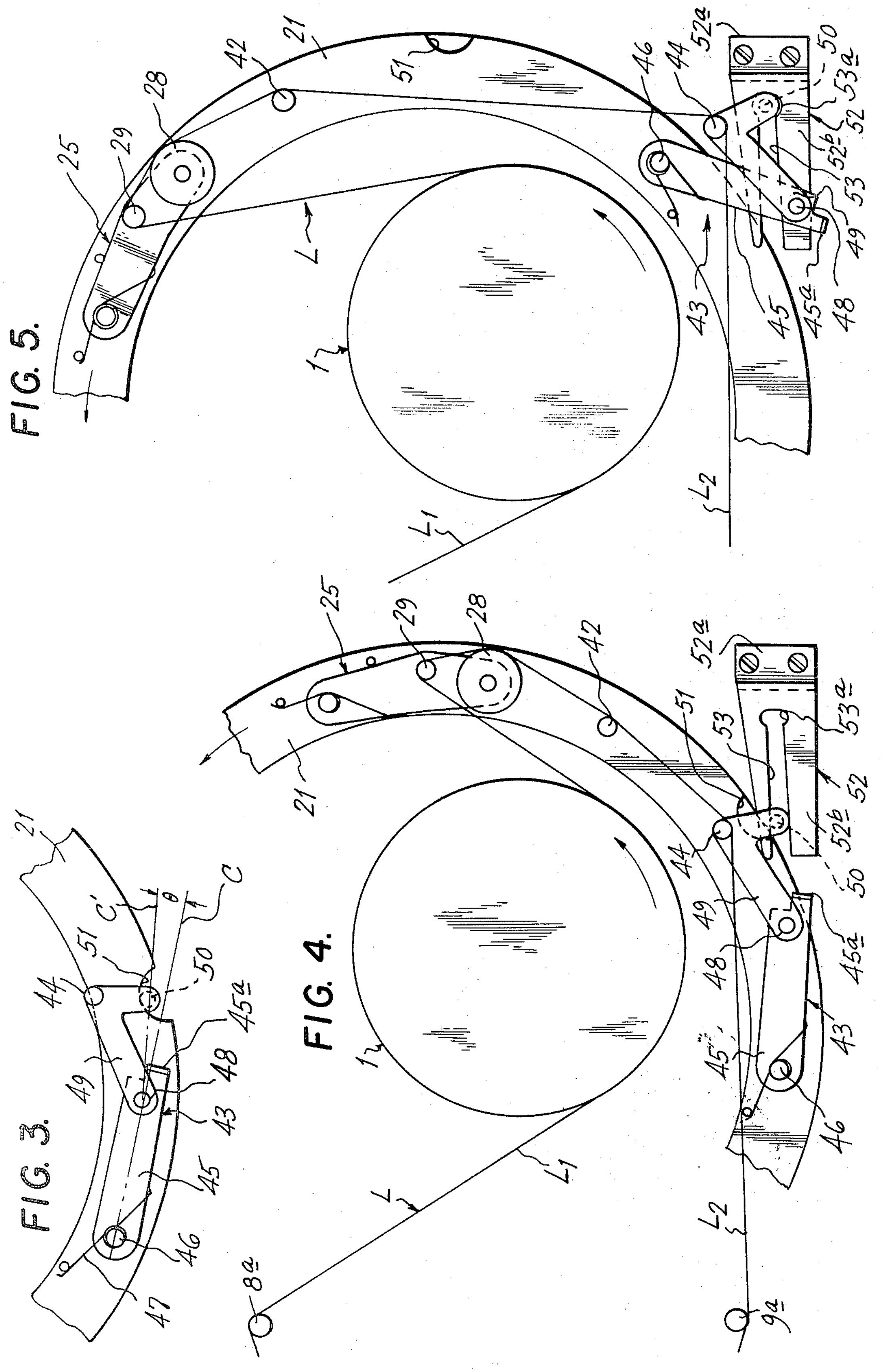
FIG. 3 is a fragmentary top plan view of the structure of FIG. 2, with the tape guiding member shown in its inner position relative to the rotatable support ring.
FIGS. 4 and 5 are fragmentary top plan views similar to portions of FIG. 1, but showing the tape loading and unloading device in respective successive stages during a loading operation.

Starting with support ring 21 in its starting or inactive position so that the pinch roller assembly 25, tape guiding assembly 43 and tape guiding pins 33 and 42 are in the positions shown in broken lines at 25′, 43′, 33′ and 42′, respectively, on FIG. 1, a cassette 4 is disposed on holder 3 and the latter is lowered to its operative position for causing pinch roller 28′, tape engaging member 29′, tape guiding pins 33′ and 42′, and tape guiding member 44′ to extend upwardly into cassette opening 10 at the side of tape run $T_1$ facing away from guide drum 1. Motor 24 is then suitably energized to cause drive roller 23 to turn support ring 21 in the counterclockwise direction. Such rotation of ring 21 causes tape engaging member 29 to draw a loop L of the tape T from cassette 4 and to wrap a side $L_1$ of the tape loop about the periphery of guide drum 1. It will be noted that, as the tape loop L is thus formed by tape engaging member 29, pinch roller 28, tape guiding pins 33 and 42 and tape guiding member 44 are all disposed within the tape loop. During continued turning of ring 21 in the counter-clockwise direction, the tape loop L is progressively extended and its side $L_1$ is further wrapped about the periphery of guide drum 1, while the other side $L_2$ of tape loop L is engaged successively by tape guide pin 42 and tape guiding member 44 and thereby held away from the periphery of guide drum 1, for example, as shown on FIGS. 4 and 5. In the course of the counterclockwise turning of ring 21, locating pin 50 enters slot 53 of actuating member 52 (FIG. 4) and moves along slot 53 toward the locking portion 53*a*. As pin 50 moves along slot 53 and pivot pin 46 continues in the counterclockwise direction along the circular path of ring 21, arms 45 and 49 begin to swing as a unit in the clockwise direction about pivot pin 46. When locating pin 50 reaches the closed end of slot 53 defined by locking portion 53*a*, further movement of pivot pin 46 along the circular path of ring 21 causes turning or jack-knifing of arm 49 in the counter-clockwise direction relative to arm 45 and rapid turning of arm 45 in the clockwise direction about pivot pin 46, for example, to the position of FIG. 5, that is, the angle $\theta$ of FIG. 3 is rapidly increased. Thereafter, continued movement of pivot pin 46 in the counterclockwise direction along the circular path of ring 21, while locating pin 50 is retained in locking portion 53*a* of slot 53, causes arm 49 to turn in the clockwise direction relative to arm 45 until arm 49 again abuts against tab 45*a* on arm 45 to restore the angular relationship $\theta$ of FIG. 3, for example, as shown in full lines on FIG. 1. Thus, tape guiding member 44 is moved to its outer position relative to ring 21 and, in so doing, is also relatively widely spaced from the tape engaging member 29 and pinch roller 28 in the direction along support ring 21.

As support ring 21 nears its operative position shown in full lines on FIG. 1, abutment 41 depending from ring 21 acts upon bell-crank 38 to pivot the latter in the clockwise direction to the illustrated position, whereby arm 34 is turned about pivot 35 to swing guide pin 33 to the position shown in full lines. Thus, guide pin 33 acts on the tape loop side $L_1$ between drum 1 and guide pin 8*a* to cause loop side $L_1$ to engage guide pin 18 and erase head 16. When support ring 21 attains its operative position, the tape loop side $L_1$ between drum 1 and tape engaging member 29 is engaged with guide pin 17 and head assembly 15 and passes between capstan 14 and pinch roller 28 which is disposed adjacent the capstan. Thus, the tape loading operation is completed and the operation of motor 24 is suitably discontinued. Upon the completion of the tape loading operation, a recording or reproducing operation can be initiated, and during such operation tape T is transported about guide drum 1 from supply reel 5 to take-up reel 6, for example, by energizing solenoid 32 to cause pinch roller 28 to press the tape against rotated capstan 14 and by suitably rotating take-up reel shaft 13.

At any desired time, the recording or reproducing operation can be discontinued, and an unloading operation initiated by suitably operating motor 24 to drive support ring 21 in the clockwise direction from the position shown in full lines to the position shown in broken lines on FIG. 1. During such turning of ring 21, one or the other of reel shafts 12 and 13 may be suitably rotated to take up, on the respective reel 5 or 6, the slack tape that results from the movement of tape engaging member 29 and the consequent reduction of the size of tape loop L. Further, the action of tape guiding assembly 43 is reversed, that is, the arms 45 and 49 thereof undergo the relative movements illustrated in FIGS. 5 and 4, in succession, in passing from the condition shown in full lines on FIG. 1 to the condition shown in broken lines. Further, as abutment 41 moves away from bell-crank 38, spring 36 acting on arm 34 is free to return tape guide pin 33 to the position shown in broken lines at 33' within cassette opening 10.

Upon the return of support ring 21 to its starting or inactive position, the tape T is fully unwrapped from guide drum 1 and restored to the run $T_1$ between guide pins 8*a* and 9*a* in cassette 4. Further, pinch roller 28, tape engaging member 29, tape guiding pin 42 and tape guiding member 44 are restored to the positions within cassette opening 10 as indicated in broken lines at 28', 29', 42' and 44', respectively. Thus, the holder 3 can be raised to permit the removal of cassette 4 therefrom.

Figures 2, 7, 8:
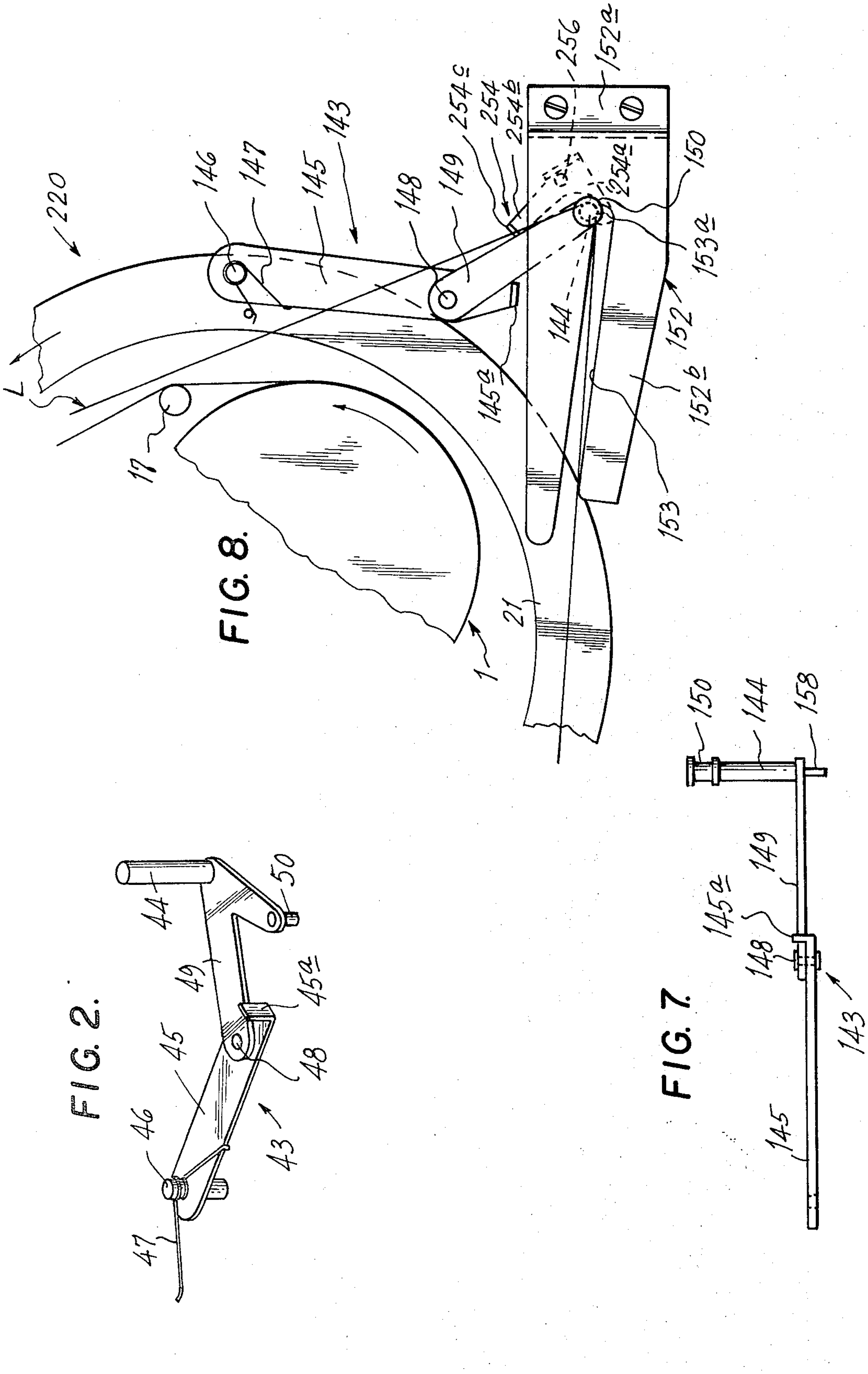
FIG. 2 is an enlarged perspective view of a tape guiding member and its mounting structure included in the device of FIG. 1.
FIG. 7 is a detail side elevational view of the tape guiding member and its mounting structure included in the embodiment of FIG. 6.
FIG. 8 is a fragmentary top plan view corresponding to a portion of FIG. 6, but showing still another embodiment of this invention.
Figure 6:
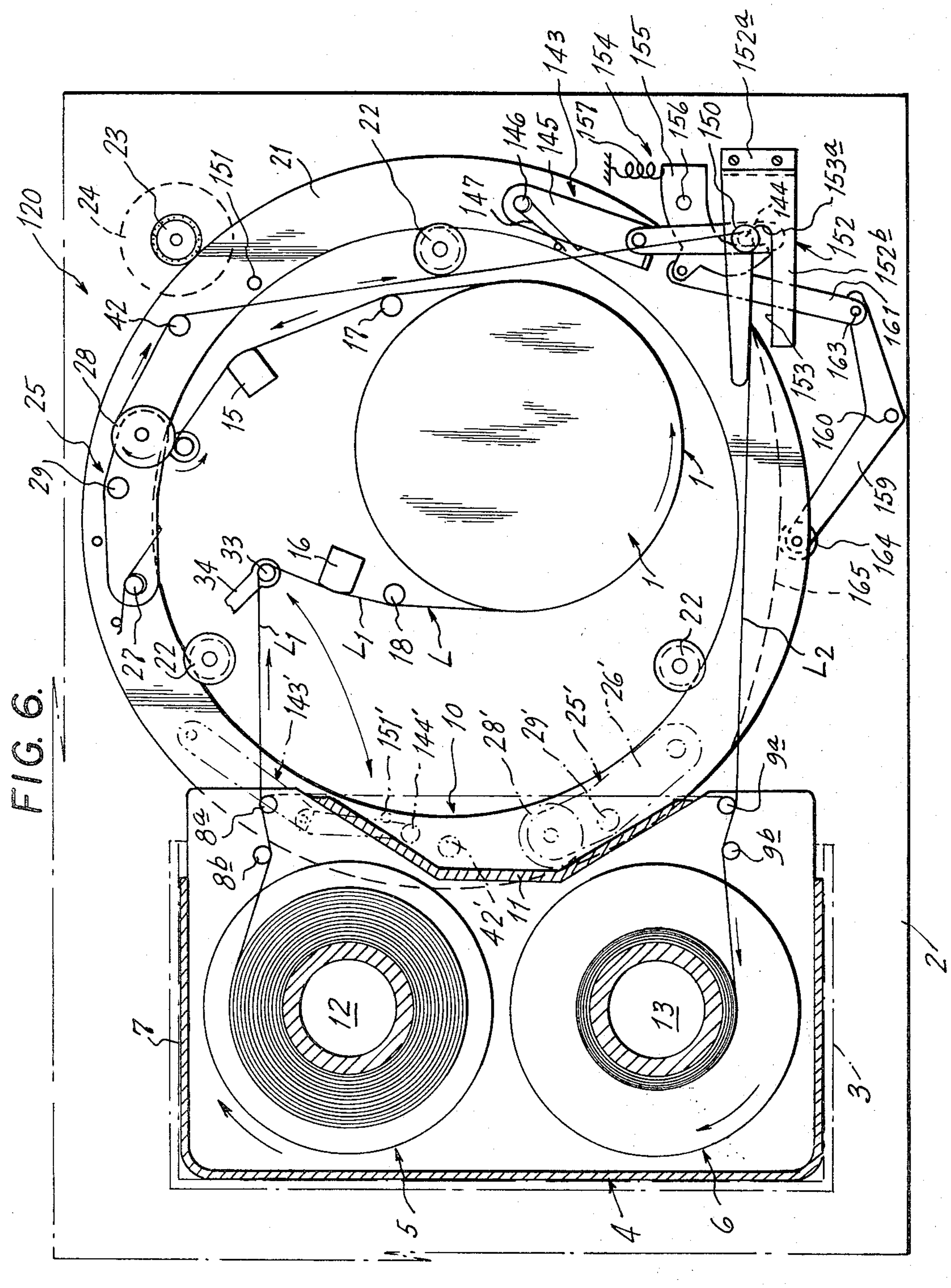
FIG. 6 is a view similar to that of FIG. 1, but showing another embodiment of the invention.

Referring now to FIGS. 6 and 7, it will be seen that the tape loading and unloading device 120 according to this invention, as there illustrated, is generally similar in structure and operation to the previously described device 20 and has its corresponding parts identified by the same reference numerals. The tape loading and unloading device 120 is shown to include a tape guiding assembly 143 which includes a tape guiding member 144 moved between an inner position and an outer position, similar to the tape guiding member 44 of device 20, and an actuating member 152 for effecting movement of member 144 to its outer position in response to turning of support ring 21 from its starting position to its operative position.

More specifically, as shown, tape guiding assembly 143 includes an arm 145 pivoted on a pin 146 carried by ring 21 and urged by a spring 147 in the counter-clockwise direction relative to ring 21, a pin 148 carried by the free end portion of arm 145, and a support arm 149 pivoted, at one end, on pin 148 and having the tape guiding member 144 projecting upwardly from its other or free end portion. A tab 145*a* extends from arm 145 and is engageable by arm 149 for limiting the clockwise turning of the latter relative to arm 145. As shown particularly on FIG. 7, the tape guiding member or pin 144 has a locating extension 150 at its upper end which is receivable in the slot 153 of the elevated portion 152*b* of actuating member 152 having its base 152*a* secured on chassis 2. A stop 151 on ring 21 is engageable by arm 149 to limit the swinging of arms 145 and 149, as a unit, by spring 147 to the position of the tape guiding assembly shown in broken lines at 143' on FIG. 6, in which tape guiding member 144' is at its inner position and relatively close to pinch roller 28' and tape engaging member 29' in the direction along ring 21.

As in the previously described embodiment of the invention, turning of ring 21 in the counterclockwise direction from its starting position towards its operative position causes locating extension 150 to enter slot 153 and to move along the latter to the laterally directed locking portion 153*a* at the closed end of the slot, whereupon arms 145 and 149 jackknife relative to each other and then relatively straighten to complete the conversion of the assembly 143 from the position shown in broken lines at 143' to the position shown in full lines.

Tape loading and unloading device 120 will be seen to differ substantially from the previously described device 20 only in respect of the provision therein of a locking assembly 154 by which tape guiding member 144 is secured in its outer position when support ring 21 attains its operative position at the completion of a tape loading operation. As shown, locking assembly 154 includes a latch member 155 which is pivoted on a pin 156 carried by chassis 2 and urged by a spring 157 in the counter-clockwise direction to engage a nose 155*a* on member 155 with a locking pin 158 (FIG. 7) which depends from tape guiding member 144. The engagement of latch member 155 with locking pin 158 is controllec by a sensing lever 159 which is pivoted, intermediate its ends, on a pin 160 carried by chassis 2, and a link 161 having its ends pivotally connected, as at 162 and 163, to latch member 155 and to one end of lever 159. The other end of lever 159 carries a cam follower roller 164 which rides upon a cam surface 165 formed on the lower portion of the outer periphery of support ring 21.

It will be seen that, when support ring 21 is at its operative position with locating extension 150 of assembly 143 in locking portion 153*a* of slot 153, cam follower roller 164 engages a portion of cam 165 at a relatively small radial distance from the center of ring 21 so that spring 157 is then effective to engage the nose 155*a* of latch member 155 with locking pin 158. Thus, during a recording or reproducing operation, tape guiding member 144 is securely held in an outer position against the tension in the tape for stable guiding of the latter. However, during turning of support ring 21 to or from its operative position, cam follower roller 164 rides on portions of cam 165 at a relatively large radial distance from the center of ring 21. Thus, lever 159 is turned in the counterclockwise direction from the illustrated position on FIG. 6, with the result that link 161 turns latch member 155 in the clockwise direction to release its nose 155*a* from locking pin 158 and thereby permit movement of locating extension 150 into, or out of the locking portion 153*a* of slot 153.

Referring now to FIG. 8, it will be seen that, in a tape loading and unloading device 220 according to another embodiment of the invention having a tape guiding assembly 143 and actuating member 154 similar to the correspondingly numbered components of the device 120, the locking assembly 154 controlled by the cam 165 is replaced by a relatively simple locking element 254. Such locking element 254 is shown to be of generally L-shaped configuration to provide arms 254*a* and 254*b*, and is pivoted between such arms on a pivot 256 carried by the chassis. Such pivot 256 is preferably arranged to provide frictional resistance to turning of element 254 thereon. The free end portion of arm 254*a* is formed as a locking nose engageable with the locking pin 158 of assembly 143 when locking extension 150 is disposed in the locking portion 153*a* of slot 153. The free end portion of the other arm 254*b* is bent into a tab 254*c* that is engageable by arm 149 of the assembly during the final movement of ring 21 to its operative position. Such engagement of arm 149 with tab 254*c* turns element 254 in the clockwise direction to the position shown on FIG. 8 where arm 254*a* engages locking pin 158 for securing locating extension 150 in locking portion 153*a* of the slot, thereby securing tape guiding member 144 in its outer position against the tape tension.

When support ring 21 is turned away from its operative position at the initiation of a tape unloading operation, the initial movement of ring 21 is accompanied by jack-knifing of arms 145 and 149 with the result that arm 149 turns in the counter-clockwise direction away from tab 254*c* to release element 254 and permit the latter to turn counter-clockwise for freeing pin 158 from arm 254*a*. Thus, locating extension 150 can move from locking portion 153*a* into the slot 153 and the action of assembly 143 proceeds as described before leaving the locking element 254 frictionally retained in its released position.

It will be apparent that, in each of the described embodiments of the invention, all of the elements of the tape loading and unloading device 20, 120 or 220 that are disposed within the tape loop at the completion of a tape loading operation are disposed within such loop at the time of the initial formation thereof for ensuring reliable performance of the tape loading operation. Further, it will be seen that the tape guiding member 44 or 144, which is initially disposed at its inner position close to tape engaging member 29, is smoothly moved to its outer position spaced a relatively large distance along ring 21 from tape engaging member 29 in response to turning of ring 21 to its operative position during a tape loading operation. As a result of such movement of tape guiding member 44 or 144, the outer side $L_2$ of the tape loop is smoothly guided and held away from guide drum 1 as such loop L is progressively drawn from the cassette and has its side $L_1$ wrapped about the guide drum.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. In a magnetic recording and/or reproducing apparatus that includes a cylindrical tape guide drum with at least one rotary magnetic head moved in a circular path substantially coinciding with the periphery of said drum, tape supply means containing a magnetic tape, holder means spaced from said guide drum for receiving and positioning said tape supply means, and a tape loading and unloading device having support means rotatable around said drum between inactive and operative positions in an arcuate path that extends adjacent said holder means, and tape engaging means on said support means movable with the latter in said arcuate path for engaging the tape contained by the tape supply means positioned on said holder means with said support means in said inactive position and for withdrawing a progressively extended loop of said tape from said supply means and wrapping one side of the extended tape loop about at least a portion of said periphery of the guide drum in response to movement of said support means from said inactive position to said operative position; the improvement comprising tape guiding means mounted on said support means for movement with the latter in trailing relation to said tape engaging means considered in the direction of movement of said support means for said inactive position to said operative position, said tape guiding means being movable relative to said support means between an inner position in respect of said arcuate path, at which said tape guiding means is disposed within said tape loop at the initiation thereof in response to the initial movement of said support means from said inactive position, and a radially outward position in respect of said arcuate path, and actuating means moving said tape guiding means from said inner position to said radially outward position in respect of said arcuate path upon movement of said support means from said inactive position to said operative position for holding the other side of said tape loop engaged by said tape guiding means away from said periphery of the drum.

2. A magnetic recording and/or reproducing apparatus according to claim 1, in which said tape supply means includes reels having said magnetic tape wound thereon and tape guide members guiding a run of said tape between said reels, and, in said inactive position of said support means, both said tape engaging means and said tape guiding means extend adjacent said run at the side of the latter facing away from said drum.

3. A magnetic recording and/or reproducing apparatus according to claim 1, in which said tape supply means includes a housing containing reels having said tape wound thereon and tape guide members guiding a run of said tape between said reels across an opening of said housing which is adjacent said arcuate path when said tape supply means is positioned on said holder means, and, in said inactive position of said support means, both said tape engaging means and said tape guiding means in said inner position thereof extend into said opening at the side of said run facing away from said guide drum.

4. A magnetic recording and/or reproducing apparatus according to claim 3, in which said tape guiding means includes arm means pivoted at one end on said support means and a tape guiding member extending from the other end of said arm means, said arm means extends generally along said arcuate path from said one end thereof in a first direction toward said tape engaging means in said inner position of said tape guiding means for disposing said tape guiding member relatively close to said tape engaging means, and said arm means extends generally in a second direction away from said tape engaging means in said outer position of the tape guiding means for then disposing said tape guiding member relatively far from said tape engaging means.

5. A magnetic recording and/or reproducing apparatus according to claim 4, in which said arm means includes first and second pivotally connected arms respectively connected to said support means and carrying said tape guiding member, and said first and second arms are relatively extended in said inner and outer positions of the tape guiding means and jackknife relative to each other in movement between said inner and outer positions.

6. A magnetic recording and/or reproducing apparatus according to claim 4, in which said actuating means includes means urging said arm means in said first direction, an actuating member fixedly positioned adjacent said arcuate path, and locating means on said arm means engageable by said actuating member to swing said arm means from said first direction to said second direction upon movement of said support means to said operative position.

7. A magnetic recording and/or reproducing apparatus according to claim 6, in which said arm means includes a first arm pivoted on said support means and a second arm pivoted on said first arm and carrying said tape guiding member, and said first and second arms are relatively extended in said inner and outer positions of the tape guiding means and jackknife relative to each other in movement of said tape guiding means between said inner and outer positions.

8. A magnetic recording and/or reproducing apparatus according to claim 6, in which said actuating member has an elongated slot opening at one end toward said arcuate path to receive said locating means and having a laterally directed portion at its other end to hold said tape guiding member in said outer position when said locating means is received in said laterally directed portion.

9. A magnetic recording and/or reproducing apparatus according to claim 8, further comprising locking means effective when said support means is at said operative position to lock said locating means in said laterally directed portion of the slot.

10. A magnetic recording and/or reproducing apparatus according to claim 9, in which said locking means includes a latch member engageable with said locating means in said laterally directed portion of the slot, and cam means movable with said support means to cause engagement of said latch member with said locating means when said support means is at said operative position.

11. A magnetic recording and/or reproducing apparatus according to claim 9, in which said locking means includes a latch member engageable with said locating means in said laterally directed portion of the slot, and means on said latch member acted upon by said arm means when said tape guiding means is in said outer position for causing said latch member to engage said locating means.

12. A magnetic recording and/or reproducing apparatus according to claim 1, further comprising locking means made operative when said support means is at said operative position to lock said tape guiding means in said outer position thereof and being released in response to movement of said support means away from said operative position.

13. A magnetic recording and/or reproducing apparatus according to claim 1, in which said support means includes a ring extending rotatably about said guide drum and having said tape engaging means and said tape guiding means mounted on said ring.

14. A magnetic recording and/or reproducing apparatus according to claim 13, further comprising a pinch roller also mounted on said ring between said tape engaging means and said tape guiding means, and a rotated capstan at a location near said ring which is adjacent said pinch roller in said operative position of said support means.

* * * * *